(12) United States Patent
Preisler et al.

(10) Patent No.: US 11,806,573 B2
(45) Date of Patent: Nov. 7, 2023

(54) SOLID, MULTI-PLASTIC HANDLEBAR

(71) Applicant: JVIS-USA, LLC, Shelby Township, MI (US)

(72) Inventors: Darius J. Preisler, Macomb, MI (US); Alexis Antonio Silva Perez, Macomb, MI (US)

(73) Assignee: JVIS-USA, LLC, Shelby Township, MI (US)

( * ) Notice: Subject to any disclaimer, the term of this patent is extended or adjusted under 35 U.S.C. 154(b) by 228 days.

(21) Appl. No.: 17/462,388

(22) Filed: Aug. 31, 2021

(65) Prior Publication Data
US 2023/0067602 A1  Mar. 2, 2023

(51) Int. Cl.
*A63B 21/00* (2006.01)
*A63B 22/06* (2006.01)
*B62K 21/12* (2006.01)

(52) U.S. Cl.
CPC ...... *A63B 21/4035* (2015.10); *A63B 22/0605* (2013.01); *B62K 21/12* (2013.01); *A63B 2209/00* (2013.01)

(58) Field of Classification Search
CPC ............ A63B 21/4035; A63B 22/0605; A63B 2209/00; B62K 21/12
USPC .............................................. 74/552, 551.1
See application file for complete search history.

(56) References Cited

U.S. PATENT DOCUMENTS

| | | | | |
|---|---|---|---|---|
| 2,059,669 A | * | 11/1936 | Skoog | B62K 21/12 74/551.1 |
| 3,529,490 A | * | 9/1970 | Humlong | B62K 21/12 74/551.8 |
| 3,530,738 A | * | 9/1970 | Kerr | B62K 21/16 74/552 |
| 4,201,830 A | * | 5/1980 | Wollen | B62D 1/11 428/401 |
| 4,276,787 A | * | 7/1981 | Kellner | B62K 21/18 74/551.8 |

(Continued)

FOREIGN PATENT DOCUMENTS

| | | | | |
|---|---|---|---|---|
| EP | 1302384 A2 | * | 4/2003 | ............... B62D 1/04 |
| GB | 2058694 A | * | 4/1981 | ............... B62D 1/06 |

OTHER PUBLICATIONS

"Thermoplastic"—Wikipedia, Jun. 12, 2023 (Year: 2023).*

(Continued)

*Primary Examiner* — Vinh Luong
(74) *Attorney, Agent, or Firm* — Brooks Kushman P.C.

(57) ABSTRACT

A solid, multi-plastic handlebar is provided. The handlebar includes an inner substrate component made of a load-bearing, structural plastic material. In one embodiment, the substrate component includes a first set of circumferentially-spaced, longitudinally-extending locking members. The handlebar also includes an outer component overlying the substrate component and made of a plastic material less rigid than the plastic material of the substrate component. The outer component is configured to be gripped by a human hand. The outer component includes a second set of circumferentially-spaced, longitudinally-extending locking members which interlock with the first set of locking members to mechanically lock the substrate component and the outer component together.

4 Claims, 4 Drawing Sheets

(56) References Cited

U.S. PATENT DOCUMENTS

| | | | | |
|---|---|---|---|---|
| 4,386,538 | A | * | 6/1983 | Van Wicklin, Jr. ...... B62D 1/04 |
| | | | | 74/552 |
| 4,876,915 | A | * | 10/1989 | Iuchi ...................... B29C 45/14 |
| | | | | 74/552 |
| 5,445,048 | A | * | 8/1995 | Kaufer .................... B29C 43/02 |
| | | | | 74/552 |
| 9,861,855 | B2 | | 1/2018 | Foley et al. |
| 2006/0211552 | A1 | | 9/2006 | Williams |
| 2018/0008859 | A1 | * | 1/2018 | Cook ................. A63B 71/0622 |
| 2019/0299449 | A1 | * | 10/2019 | Patel .................... B26B 21/225 |

OTHER PUBLICATIONS

Two shot injection molding process, Microsoft Bing, Jun. 10, 2023 (Year: 2023).*

What is a Thermoplastic? (Definition and Examples), contactus@twi.co.uk, Jun. 11, 2023 (Year: 2023).*

Machine translation of EP 1302384A2, Lorenz et al., Apr. 16, 2003 (Year: 2003).*

* cited by examiner

SOLID, MULTI-PLASTIC HANDLEBAR

TECHNICAL FIELD

At least one embodiment of the present invention generally relates to handlebars and, in particular, to solid, multi-plastic handlebars especially for exercise equipment or devices, such as aerobic exercise equipment. Other devices which include handlebars are JetSkis and motorbikes, and stationary versions of these (for use in training or entertainment) are also well known.

OVERVIEW

As described in U.S. Pat. No. 9,861,855, there is illustrated a stationary bike with integrated or connected digital hardware including at least one display screen. The stationary bike may comprise a frame, a handlebar post to support handlebars, a seat post to support the seat, a rear support and a front support. Pedals are used to drive a flywheel via a belt, chain, or other drive mechanism. The flywheel may be a heavy metal disc or other appropriate mechanism. The force on the pedals necessary to spin the flywheel can be adjusted using a resistance adjustment knob. The resistance adjustment knob may directly or indirectly control a device that increases or decreases the resistance of the flywheel to rotation. For example, rotating the resistance adjustment knob clockwise may cause a set of magnets to move relative to the flywheel, increasing its resistance to rotation and increasing the force that the user may apply to the pedals to make the flywheel spin.

The stationary bike may also include various features that allow for adjustment of the position of the seat, handlebars, etc. A display screen may be mounted in front of the user forward of the handlebars. Such display screen may include a hinge or other mechanism to allow for adjustment of the position or orientation of the display screen relative to the rider.

As described in Patent Publication No. 2006/0211552, and referring particularly to FIGS. 2-4, a handlebar may be bent from a single hollow bar of steel, although cutting and welding may also be used to form its shape. Alternatively, materials such as plastic, rubber, polymer, or other metal alloys may be used. The handlebar may be a unitary structure, that is, a single continuous structure in its finished form. The handlebar may be painted or chrome-plated to protect it form rust where metals are used.

A handlebar typically includes a plurality of hand grips positioned to allow the user to benefit from the number of different shapes presented by the handlebar. Each grip may be made to be slid onto or inserted over the handlebar as a cylinder of rubber, or polymer, or other resilient material suitable for providing a non-slip contact between the user's hand and the handlebar. Between some (but not necessarily all) of the grips there are positioned connectors for removably securing the handlebar at different points to the free end of a cable or other fastener extending from a weight machine. The connectors may be metal lugs welded, or otherwise formed or secured, to the handlebar, each with one or more holes suitable for receiving a fastener, such as a hooked end of a cable, or may be made of a strong synthetic fabric connected to the handlebar to provide a loop capable of receiving such a fastener.

Additionally, the handlebar may include stoppers at each free end of left and right extending portions. The stoppers are configured to provide extra resistance to sliding when the user is pulling his hands towards the free ends of the extending portions. The stoppers may be formed of any suitable fairly hard material such as wood, rubber, or plastic. Preferably, a portion of each stopper may be inserted into a bore of the free end of the extending portion, and may be attached thereto by drilling a bolt through the handlebar and through the inserted portion of the stopper, thereafter filing off any protruding portions of the bolt to leave a smooth surface to the extending portion.

Metal handlebars, even those which are hollow, tend to be heavy and costly. Such handlebars are also typically difficult to manufacture especially in high volume.

As used in this application, the term "substrate" refers to any semi-flexible or rigid inner component having an outer surface to which an outer component is or can be injection molded such as, without limitation, polymers and other plastics, as well as composite materials. Furthermore, the shape of the substrate component, and, particularly, the surface to be overlaid can be any part of an assembly or device manufactured by conventional, multi-material injection molding. One preferred application contemplated herein is the overlying of a substrate component that are handlebar components such as handlebar components for exercise equipment.

The term "overlies" and cognate terms such as "overlying" and the like, when referring to the relationship of an outer component relative to an inner substrate component, means that the outer component partially or completely lies over the inner substrate component. The outer component overlying the inner substrate component may or may not be in contact with the substrate component.

SUMMARY OF EXAMPLE EMBODIMENTS

An object of at least one embodiment of the present invention is to provide solid, multi-plastic handlebar which is lightweight yet strong.

Another object of at least one embodiment of the present invention is to provide a solid, multi-plastic handlebar which is relatively easy to manufacture, and is less costly to make compared to previous handlebars especially in high volume applications.

In carrying out the above objects and other objects of at least one embodiment of the present invention, a solid, multi-plastic handlebar is provided. The handlebar includes an inner substrate component made of a load-bearing, structural plastic material. The substrate component includes a first set of circumferentially-spaced, longitudinally-extending locking members. The handlebar also includes an outer component overlying the substrate component and made of a plastic material less rigid than the plastic material of the substrate component. The outer component is configured to be gripped by a human hand. The outer component includes a second set of circumferentially-spaced, longitudinally-extending locking members which interlock with the first set of locking members to mechanically lock the substrate component and the outer component together.

Both of the components may be injection molded in a two-shot, injection molding process.

The plastic material of both components may be thermoplastic.

The thermoplastics of the components may be compatible so that the components adhere to each other.

The first set of locking members may include a pair of head portions which extend radially outwardly in opposite directions from a base portion of the substrate component. The base portion may extend radially outwardly in opposite directions substantially perpendicular to the head portions.

The outer component may have a decorative, soft-touch finish.

Further in carrying out the above objects and other objects of at least one embodiment of the present invention, a solid, multi-plastic handlebar for exercise equipment is provided. The handlebar includes an inner substrate component made of a load-bearing, structural plastic material. The substrate component includes a first set of circumferentially-spaced, longitudinally-extending locking members. The handlebar also includes an outer component overlying and in contact with the substrate component and made of a plastic material less rigid than the plastic material of the substrate component. The outer component is configured to be gripped by a human hand. The outer component includes a second set of circumferentially-spaced, longitudinally-extending locking members which inter-engage with the first set of locking members to mechanically lock the substrate component and the outer component together.

The components may be injection molded in a two-shot, injection molding process.

The plastic material of both components may be thermoplastic.

The thermoplastics of the components may be compatible so that the components adhere to each other.

The first set of locking members may include a pair of head portions which extend radially outwardly in opposite directions from a base portion of the substrate component. The base portion may extend radially outwardly in opposite directions substantially perpendicular to the head portions.

The outer component may have a decorative, soft-touch finish.

Still further in carrying out the above objects and other objects of at least one embodiment of the present invention, a solid, multi-plastic handlebar for aerobic exercise equipment is provided. The handlebar includes an inner substrate component made of a load-bearing, structural plastic material and an outer component overlying and in contact with the substrate component and made of a plastic material less rigid than the plastic material of the substrate component. The outer component is configured to be gripped by a human hand. The inner and outer components have inter-engaging lobed profiles to mechanically lock the substrate component and the outer component together.

The components may be injection molded in a two-shot, injection molding process.

The plastic material of both components may be thermoplastic.

The thermoplastics of the components may be compatible so that the components adhere to each other.

The inner substrate component may have a first set of locking members including a pair of head portions which extend radially outwardly in opposite directions from a base portion of the substrate component. The base portion may extend radially outwardly in opposite directions substantially perpendicular to the head portions.

The outer component may have a decorative, soft-touch finish.

The aerobic exercise equipment may comprise an exercise bicycle.

The exercise bicycle may comprise a stationary exercise bicycle.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In two shot injection molding, a product is formed by injecting two different materials into the same mold. These materials are not injected simultaneously, but rather in succession. It is, however, done in one manufacturing step in which the product is not ejected from the mold between the two shots.

Two shot injection molding offers freedom to the designer, as it negates the use of multiple steps in manufacturing. It provides many advantages such as lower manufacturing cost, better aesthetics, and ergonomics, superior mechanical bonds and lower production times. The process of two shot injection molding can manufacture ergonomically designed products to perfection. Structural plastic can easily be covered or added on using materials that are more suited for human interface. Soft, rubbery material is better equipped for the human hand as it provides a grip and a softer touch.

Figure 1:
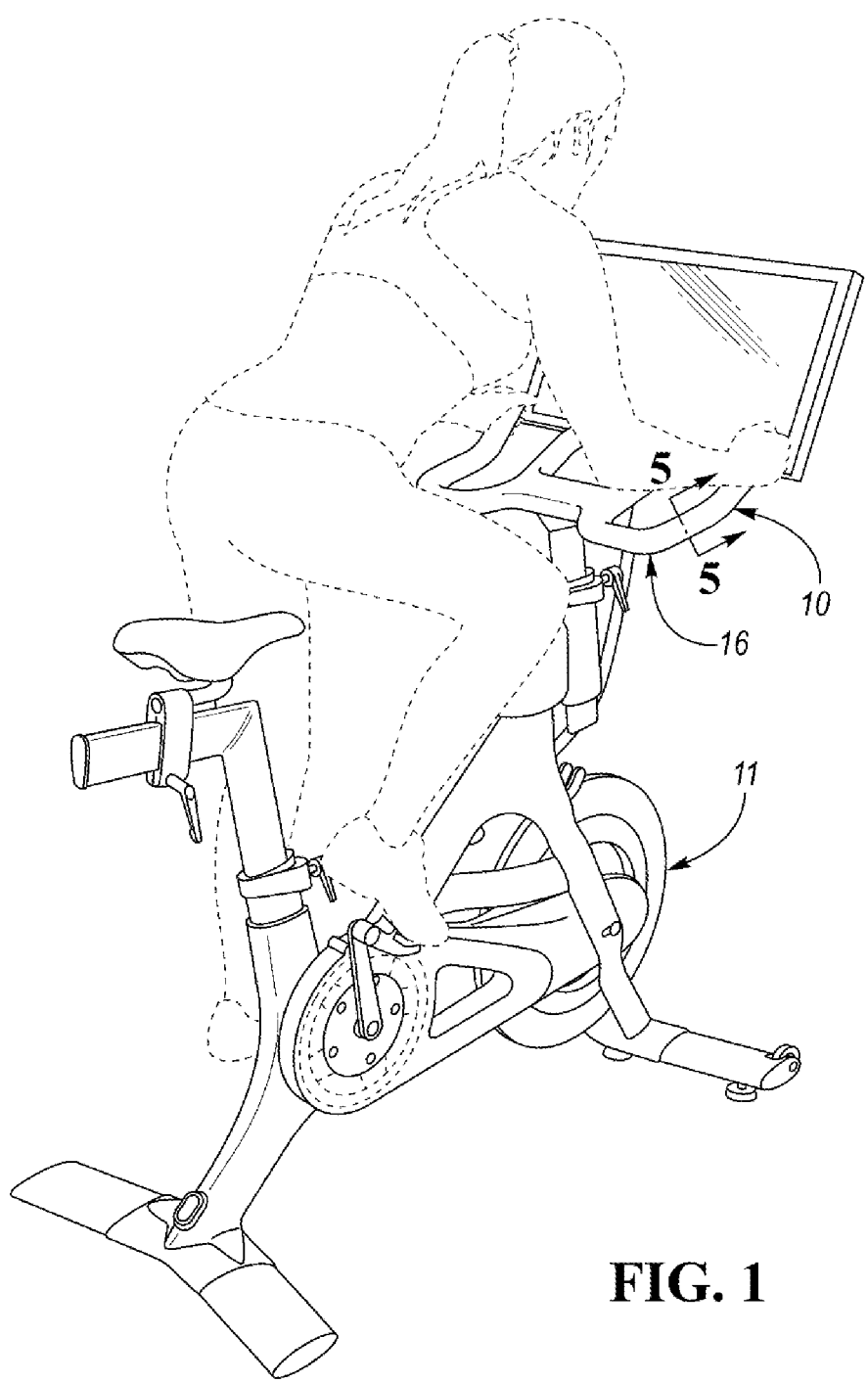
FIG. 1 is an environmental, rear perspective view of a stationary exercise bike with a rider shown by phantom lines.
Figure 2:
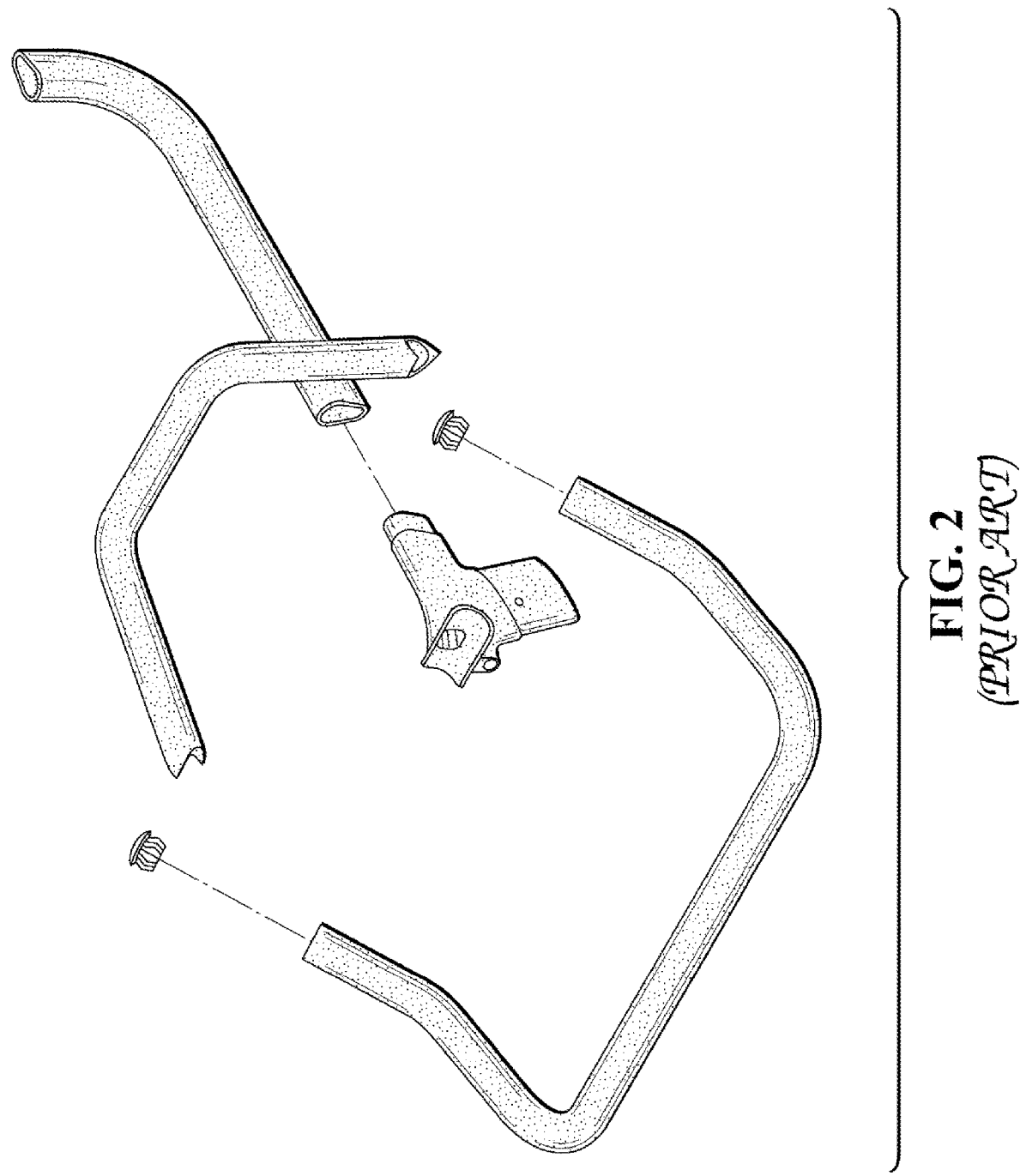
FIG. 2 is an exploded perspective view of a prior art handlebar assembly.
Figure 3:
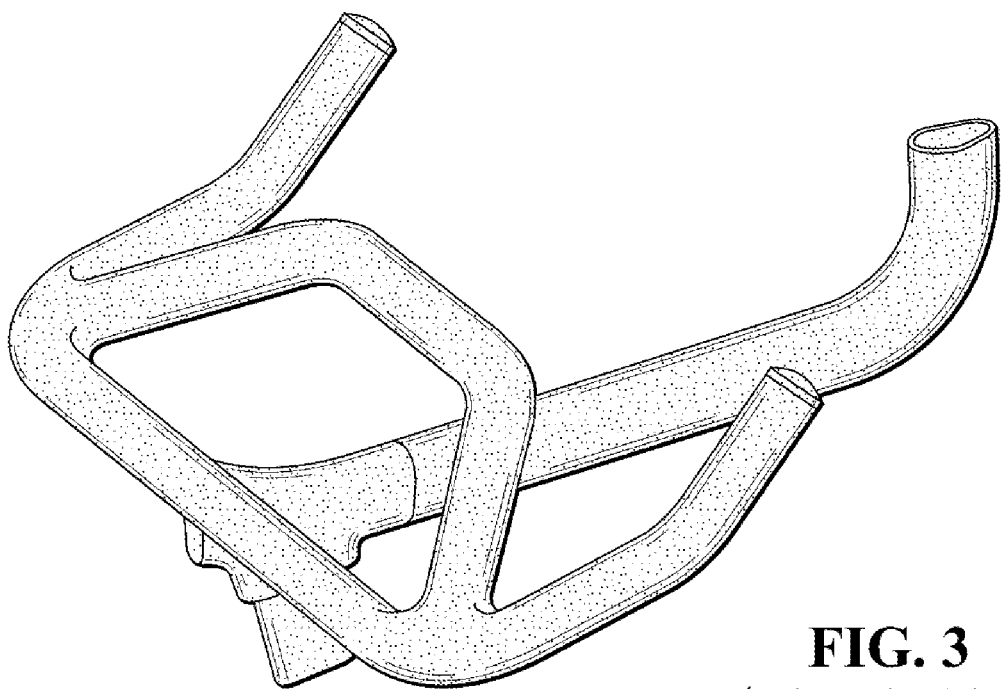
FIG. 3 is a top perspective view of the handlebar assembly of FIG. 2.
Figure 4:
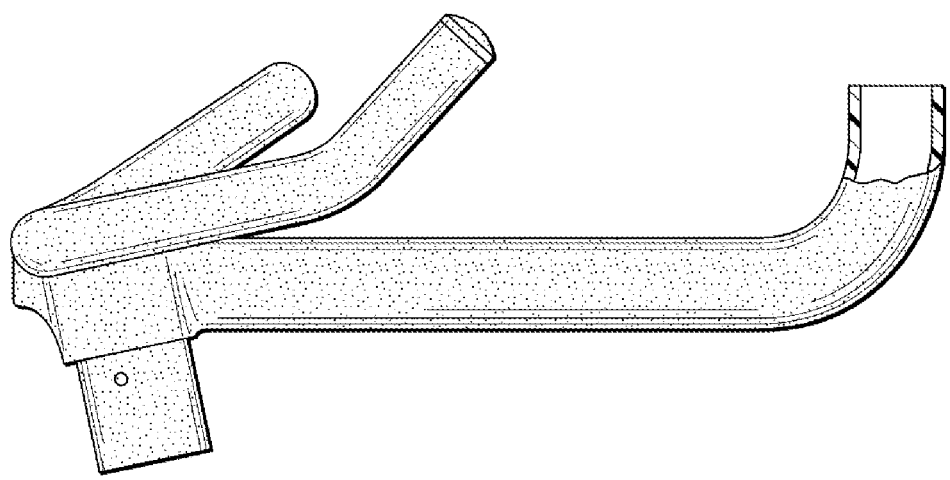
FIG. 4 is a side elevational view of the handlebar assembly of FIG. 2.
Figure 5:
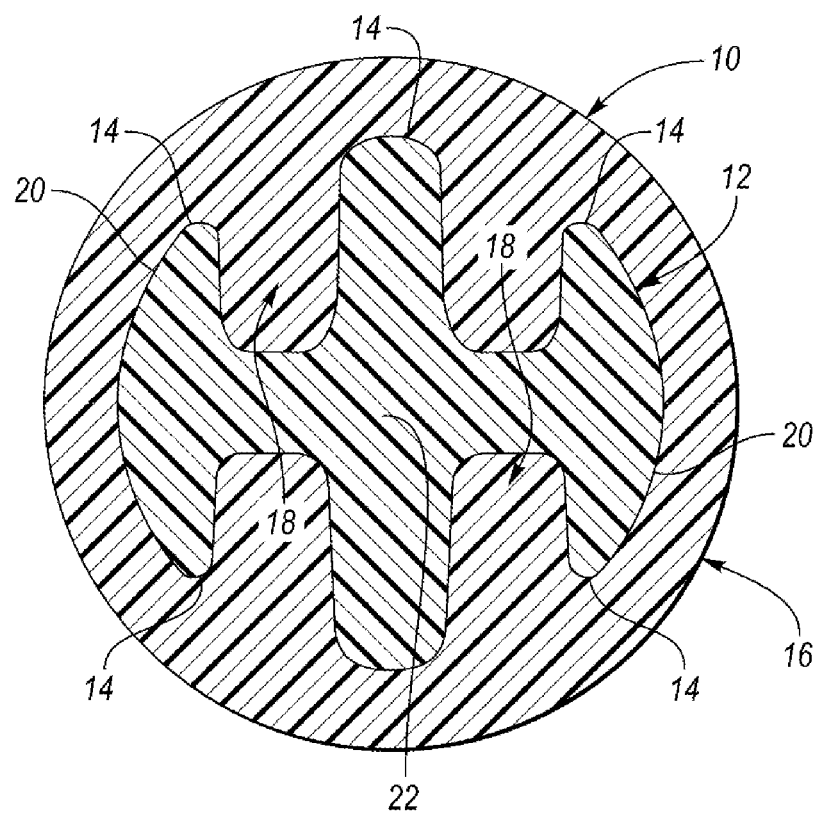
FIG. 5 is a sectional view of a solid, multi-plastic handlebar taken along lines 5-5 of FIG. 1 and constructed in accordance with at least one embodiment of the present invention.

Referring now to the drawing FIGS. 1 and 5, there is illustrated an exercise bicycle, generally indicated at 11, including a solid, multi-plastic handlebar, generally indicated at 10. The handlebar 10 includes an inner substrate component, generally indicated at 12, made of a load-bearing, structural plastic material. The substrate component 12 including a first set of circumferentially-spaced, longitudinally-extending locking members 14.

The handlebar 10 also includes an outer component, generally indicated at 16, overlying and in contact with the substrate component 12 and made of a plastic material less rigid than the plastic material of the substrate component 12. The outer component 16 is configured to be gripped by a human hand as shown in FIG. 1. The outer component 16 includes a second set of circumferentially-spaced, longitudinally-extending locking members 18 which interlock or inter-engage with the first set of locking members 14 to mechanically lock the substrate component 12 and the outer component 16 together. In other words, the inner and outer components 12 and 16 have inter-engaging lobed profiles to mechanically lock the components 12 and 16 together.

Both of the components 12 and 16 are preferably injection molded in a two-shot, injection molding process. The plastic material of both components 12 and 16 is thermoplastic. The thermoplastics of the components 12 and 16 are compatible so that the components adhere to each other.

The first set of locking members 14 include a pair of head portions 20 which extend radially outwardly in opposite directions from a base portion 22 of the substrate component 12. The base portion 22 extends radially outwardly in opposite directions substantially perpendicular to the head portions 20.

The outer component 16 preferably has a decorative, soft-touch finish.

The handlebar 10 may be used for exercise equipment such as aerobic exercise equipment like the stationary exercise bike 11 of FIG. 1.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A solid, multi-plastic handlebar for a stationary exercise bicycle, the handlebar comprising:
    an inner substrate component made of a load-bearing, structural plastic material, the substrate component including a first set of circumferentially-spaced, longitudinally-extending locking members; and
    an outer component surrounding the substrate component and made of a plastic material less rigid than the plastic material of the substrate component, wherein the outer component is configured to be gripped by a human hand during use of the stationary exercise bicycle and wherein the outer component includes a second set of circumferentially-spaced, longitudinally-extending locking members which interlock with the first set of locking members to mechanically lock the substrate component and the outer component together and wherein the first and second sets of locking members have inter-engaging lobed profiles to mechanically lock the substrate component and component together; and wherein the first set of locking members include a pair of head portions which extend radially outwardly in opposite directions from a base portion of the substrate component, and wherein the first set of locking members further include a pair of locking members which extend radially outwardly in opposite directions from the base portion substantially perpendicular to the head portions.

2. The handlebar as claimed in claim 1, wherein both of the components are injection molded in a two-shot, injection molding process.

3. The handlebar as claimed in claim 2, wherein the plastic material of both components is thermoplastic.

4. The handlebar as claimed in claim 3, wherein the thermoplastics of the components are compatible so that the components adhere to each other.

* * * * *